United States Patent [19]

Abe et al.

[11] Patent Number: 4,811,015

[45] Date of Patent: Mar. 7, 1989

[54] ABNORMAL DATA TRANSMISSION DETECTION CIRCUIT FOR TIME-DIVISION MULTIPLEX TRANSMISSION NETWORK SYSTEM

[75] Inventors: Noriyuki Abe; Kazuyoshi Okada, both of Yokosuka, Japan

[73] Assignee: Nissan Motor Company, Limited, Japan

[21] Appl. No.: 838,551

[22] Filed: Mar. 11, 1986

[30] Foreign Application Priority Data

Apr. 1, 1985 [JP] Japan .................. 60-68762

[51] Int. Cl.$^4$ .............................. H04Q 9/00
[52] U.S. Cl. ............... 340/825.070; 340/825.140; 340/825.210; 340/825.520
[58] Field of Search .......... 340/825.07, 825.62, 340/825.63, 825.64, 825.52, 825.2, 825.14, 825.21, 825.36, 825.37; 328/120, 119, 129.1; 371/55, 61, 62, 64–68; 370/100

[56] References Cited

U.S. PATENT DOCUMENTS

| | | | |
|---|---|---|---|
| 3,403,382 | 9/1968 | Frielinghaus et al. | 340/825.65 |
| 3,938,082 | 2/1976 | Schowe, Jr. | 371/62 |
| 3,946,380 | 3/1976 | Ohnishi et al. | 340/825.62 |
| 4,175,238 | 11/1979 | Breimesser et al. | 340/825.21 |
| 4,180,803 | 12/1979 | Wesemeyer et al. | 340/825.21 |
| 4,484,190 | 11/1984 | Bedard | 340/825.57 |
| 4,486,883 | 12/1984 | Kanai | 340/825.07 |
| 4,545,055 | 10/1985 | Patel | 371/55 |
| 4,559,536 | 12/1985 | Olesen et al. | 340/825.07 |
| 4,567,587 | 1/1986 | McDermott | 370/100 |
| 4,682,168 | 7/1987 | Chang et al. | 340/825.52 |

FOREIGN PATENT DOCUMENTS

| | | |
|---|---|---|
| 2810668 | 9/1978 | Fed. Rep. of Germany . |
| 51-67013 | 10/1976 | Japan . |
| 1096403 | 12/1967 | United Kingdom . |
| 1287334 | 8/1972 | United Kingdom . |
| 1298190 | 11/1972 | United Kingdom . |
| 1427133 | 3/1976 | United Kingdom . |
| 1462052 | 1/1977 | United Kingdom . |
| 1494240 | 12/1977 | United Kingdom . |
| 2041592A | 9/1980 | United Kingdom . |

OTHER PUBLICATIONS

Ein byteserielles bitparalleles Schnittstellensystem fur programmierbare mebgerate–DIN IEC 625 Teil 1 Mai 1981.
Microprocessor Interfacing Techniques–ZAKS.
"Wie Funktioniert der IEC-BUS" by Dipl.-Ing. Jurgen Klaus, pp. 72–78, Elektronik 1975.

*Primary Examiner*—Donald J. Yusko
*Attorney, Agent, or Firm*—Lowe, Price, LeBlanc, Becker & Shur

[57] ABSTRACT

A circuit for detecting an abnormal transmission state on a signal transmission line, the abnormal state being such that a short-circuit or open-circuiting occurs in the signal transmission line, applicable to a time-division multiplex transmission network system having an address clock line and a data transmission line. The circuit includes a first latch circuit, which is set by a trailing edge of a data receivable interval specification pulse to a state indicating no presence of the specification pulse, wherein the specification pulse is derived from an address coincidence circuit constituting one data receiver of the network system. The first latch circuit latches the state of presence or absence of the specification pulse on a trailing edge of a start bit constituting data to be received. The circuit further includes a second latch circuit which is initially set to a state indicating the state of the presence of the specification pulse and which latches the state of presence or absence of the specification pulse latched in the first latch circuit at a time when a duration of the specification pulse continues and which operates with a slight delay with respect to the appearance of the trailing edge of the start bit on the data transmission line.

14 Claims, 3 Drawing Sheets

FIG. 1
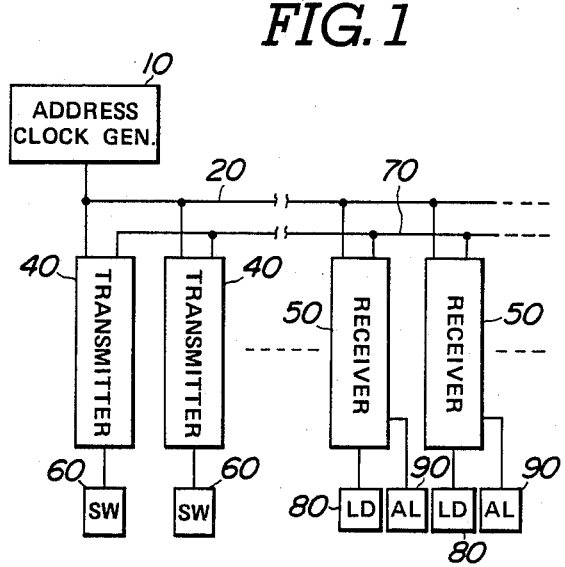
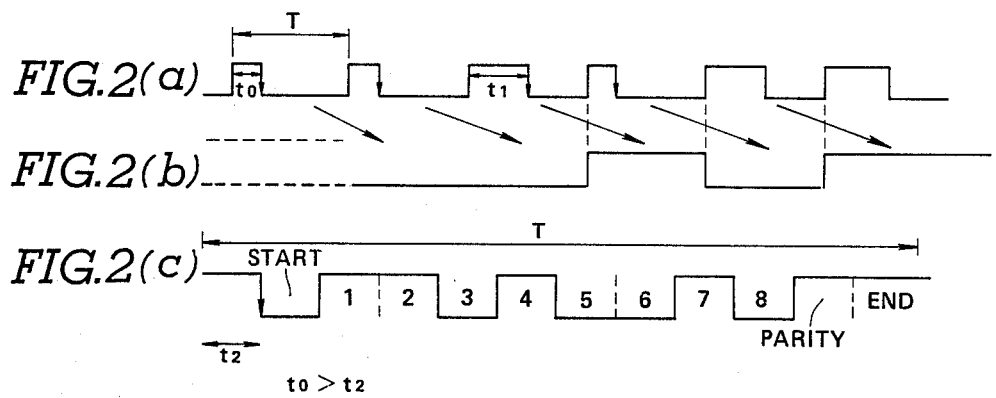
$t_0 > t_2$

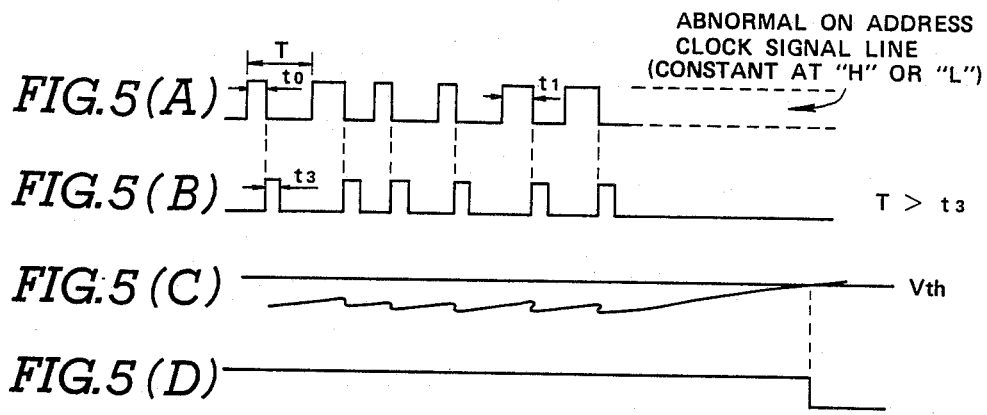
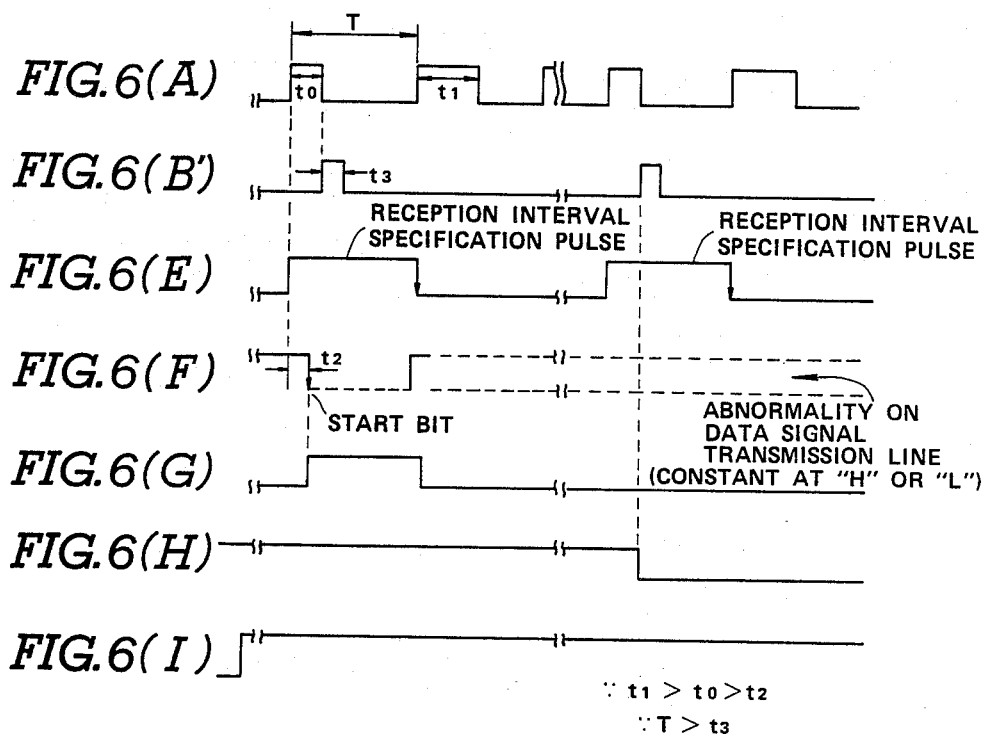

ABNORMAL DATA TRANSMISSION DETECTION CIRCUIT FOR TIME-DIVISION MULTIPLEX TRANSMISSION NETWORK SYSTEM

BACKGROUND OF THE INVENTION

1. Field of the Invention

The present invention relates to an abnormal data transmission detection circuit applicable to a time-division multiplex data transmission network system.

2. Description of the Prior Art

A conventional abnormal data transmission detection circuit is exemplified by a Japanese Patent Application Unexamined Open No. Sho. 51-67013 published on June 10, 1976.

In the above-identified Japanese Patent Application document, the abnormal transmission detection circuit is connected between a power supply such as a battery and clock generator constituting a time-division multiplex transmission network system. The clock generator outputs a clock pulse to a clock signal transmission line. A plurality of data transmitters and receivers are interconnected via a data transmission line, and each of the data transmitters and receivers receives the power supply via a power supply line and abnormal transmission detection circuit from the power supply and the clock pulse via the clock signal transmission line from the clock generator. The abnormal transmission detection circuit monitors the presence or absence of abnormality in transmission states of the connected clock signal and data transmission lines. The abnormal transmission detection circuit comprises a smoothing circuit including a capacitor and resistor and if a short-circuit or open-circuit occurs, the smoothing circuit receives a constant voltage so that a transistor connected to the smoothing circuit turns on and alarm unit connected to the transistor is actuated to produce an alarm and the power supply line is disconnected. However, in this case, the abnormal transmission detection circuit often erroneously detect the abnormality on the data transmission line while no signal is transmitted on the data transmission line.

In addition, since in the abnormal data transmission detection circuit having another construction a time interval between consecutive pulses transmitted sequentially on the same signal transmission line compares with a reference time determined by a time constant of a capacitor-and-resistor (CR) circuit in order to detect the data transmission abnormality due to a short circuiting or open-circuit of the line or failure in any transmitter or receiver, a time required for the detection of abnormality becomes longer and a capacitor having a high capacity becomes necessary so that it becomes difficult to integrate the detection circuit in an Integrated Circuit form, in a case when the data abnormal transmission detection circuit is applied to a multichannel time-division multiplex transmission network system in which the time interval between consecutively transmitted pulses can often become considerably longer even when the normal data transmission and reception are carried out between a pair of data transmitter and data receiver in one channel.

SUMMARY OF THE INVENTION

With the above-described problem in mind, it is an object of the present invention to provide an abnormal data transmission detection circuit which is short in the abnormal detection time, requires no capacitor having a large capacity, and facilitate the integration of the whole circuit when applied to the multichannel time-division multiplex data transmission network system.

This can be achieved by providing an abnormal data transmission detection circuit comprising: (a) first means for generating a periodic pulse train signal and transmitting the periodic pulse train signal, (b) second means for providing a passage for transmitting a data from a first station to a second station when the periodic pulse train signal from the first means is received and one of the series of addresses derived from the periodic pulse train signal accords with a predetermined address, (c) third means for generating and outputting a first signal when no pulse from the first means is present for a predetermined interval of time, (d) fourth means for generating and outputting a second signal when no data from the second means is present, the address being according with the predetermined address, and (e) fifth means for producing an alarm in response to at least one of the first and second signals.

BRIEF DESCRIPTION OF THE DRAWINGS

A more complete understanding of the present invention may be obtained from the following detailed description taken in conjunction with the attached drawings in which like reference numerals designate corresponding elements and in which:

FIG. 1 is a block diagram of an entire time-shared multiplex transmission network system to which the present invention is applicable;

FIGS. 2(a) through 2(c) are waveform charts of signal states in respective circuits in FIG. 1;

FIGS. 5(A) through 5(D) are waveform charts for explaining an abnormal transmission detection operation on an address clock line shown in FIG. 1; and FIGS. 6(A), 6(B); 6(E) through 6(I) are waveform charts for explaining an abnormal data transmission on a data transmission line shown in FIG. 1.

DETAILED DESCRIPTION OF THE PREFERRED EMBODIMENT

Figure 3:
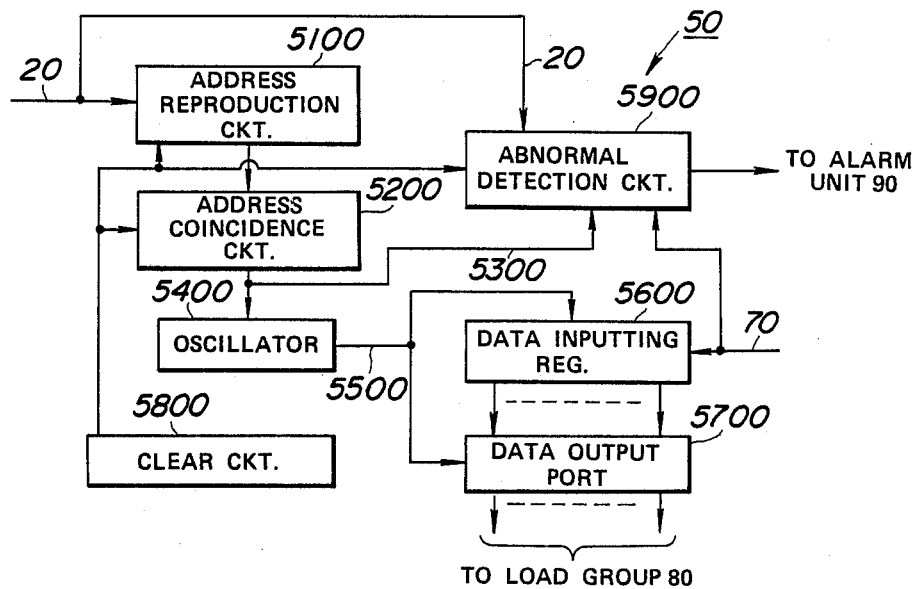
FIG. 3 is a circuit block diagram of internal circuits in a receiver shown in FIG. 1.

Reference will hereinafter be made to the drawings in order to facilitate understanding of the present invention.

First, an example of entire time-division multiplex transmission network system will be described with reference to FIG. 1 and FIG. 2.

In FIG. 1, an address clock generator 10 sends a pulse-width modulated periodic code string signal (for example, M-series code string signal) having a period of T as shown in FIG. 2(a) via an address clock signal transmission line 20 to each data transmitter 40 and data receiver 50. Each period T is defined as a time slot of the network system.

The data transmitter 40 demodulates the above-described periodic signal derived from the address clock generator 10 as shown in FIG. 2(b) to reproduce a series of addresses corresponding to predetermined code string patterns in synchronization with a clock signal as signal component of the periodic signal.

At this time, if one of the reproduced address coincides with its own address allocated to the station (data transmitter), the transmitter 40 sends a data of a predetermined number of bits received in parallel from a switch group 60 in a serial form to a data transmission line 70 as an NRZ (Non-Return To Zero) coded signal having a start bit and end bit, for example, as shown in FIG. 2(c).

On the other hand, in the data receiver 50, the above-described signal from the address clock generator 10 is demodulated in synchronization with the clock signal to reproduce a series of the addresses as shown in FIG. 2(b). If one of the reproduced address coincides with its own address allocated to the station (receiver 50) during the time slot, the receiver 50 receives the data on the data transmission line 70 in the serial form and outputs the data converted in a parallel form to a load group 80.

The abnormal data transmission detection circuit according to the present invention is built in the data receiver 50. If a transmission abnormality (for example, the signal level of "H" or "L" continues for a constant period of time) occurs in either the address clock signal line 20 or data transmission line 70, an alarm unit 90 issues a predetermined alarm.

Next, the details of the data receiver 50 will be described with reference to FIG. 3.

An address reproduction circuit 5100 demodulates the above-described address clock signal shown in FIG. 2(a) on the address clock line 20 in synchronization worth the address clock signal, i.e., clock signal, as shown in FIG. 2(b) to reproduce the series of addresses.

The address reproduction circuit 5100 comprises, for example, a monostable multivibrator which receives the address clock signal shown in FIG. 2(a) and outputs a pulse having the given period T whenever the address clock signal rises. Circuit 5100 also includes a multi-bit shift register which reproduces each predetermined code string pattern sequentially in synchronization with each falling edge of the pulse outputted from the monostable multivibrator. The number of bit stages of the shift register described above is, for example, three in the case when a third-order M-series code string is used in the address code generator 10.

An address coincidence circuit 5200 comprising a digital comparator compares one of the series of addresses reproduced by means of the address reproduction circuit 5100 with its own address allocated to the receiver. A receiving interval specification pulse having a pulsewidth corresponding to the above-described period T (refer to FIG. 6(E)) is, at this time, sent to an address coincidence signal line 5300 only if they coincide with each other.

An oscillator 5400 starts oscillation in response to a leading edge of the above-described receiving interval specification pulse sent on the address coincidence signal line 5300 and sends a reception clock on a reception clock signal line 5500.

A data inputting shift register 5600 reads the data on the data signal transmission line 70 in the serial mode of the NRZ code in synchronization with the received clock sent on the received clock signal line 5500 and outputs the converted data in the parallel form to a data output port 5700 at a predetermined timing.

In this way, the received data is sent to the load group 80 via the data output port 5700.

A clear circuit 5800 clears the address reproduction circuit 5100, address coincidence circuit 5200, and abnormal transmission detection circuit 5900 to be described later at a predetermined timing, i.e., at the same time that a power supply is turned on.

Figure 4:
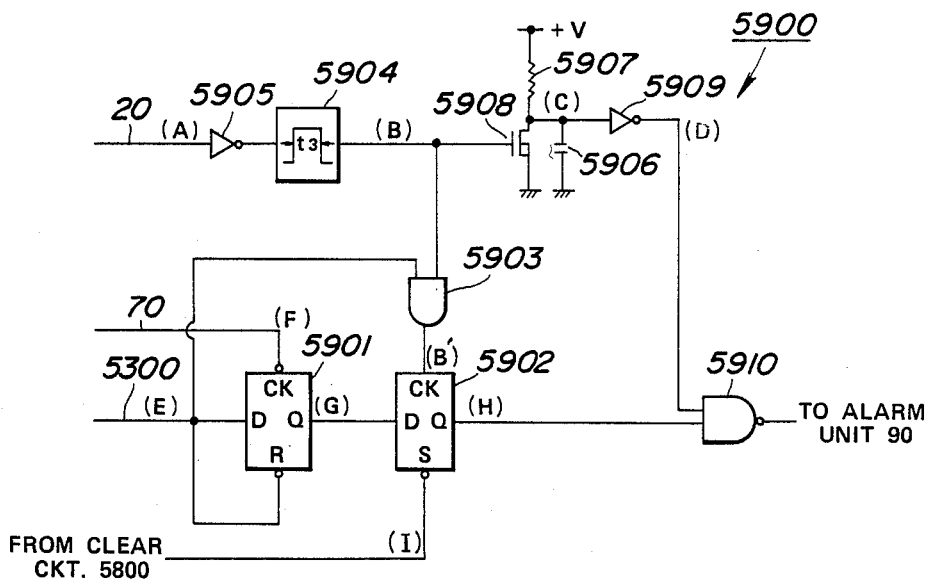
FIG. 4 is a circuit block diagram of an abnormal data transmission detection circuit in a preferred embodiment.

Next, the detailed construction of the abnormal detection circuit 5900 according to the present invention will be described below with reference to FIG. 4.

If some transmission abnormality (the contents of transmission abnormality is described below) occurs in the address clock signal transmission line 20 or data signal transmission line 70, the abnormal transmission detection circuit 5900 informs of the detection result described above to the alarm unit 90.

The contents of abnormality includes a case in which the level of either of the signal transmission lines 20 or 70 continues for a constant period of time to be "H" or "L" level. It is noted that "H" level, e.g., corresponds to +12 V and "L" level corresponds to 0 V.

The abnormal transmission circuit 5900 has two functions. Specifically, it is the function of circuit 5900 to detect abnormal transmission on the data signal line 70 and transmission abnormality on the data address clock line 20.

First, the construction of the detection circuit 5900 for the abnormal transmission on the data transmission line 70 will be described below.

The data signal transmission line 70 is connected to a clock input terminal CK of a first latch circuit 5901 comprising a D-type flip-flop circuit and the address coincidence line 5300 is connected to a data input terminal D and reset input terminal R of the flip-flop circuit 5901 (first latch circuit).

Hence, the Q output of the first latch circuit 5901 is set to a "L" (low level), i.e., indicates no presence of pulse, upon occurrence of a trailing edge of the reception interval specification pulse (refer to FIG. 6(E)) which appears on the output terminal of the address coincidence circuit 5200. In addition, the first latch circuit 5901 latches the output level state of the address coincidence circuit 5200 at a time of reception of the trailing edge of a pulse on the data transmission line 70, i.e., a state of presence or absence of the incoming reception interval specification pulse (refer to FIG. 6(E), (F), and (G)).

Since the trailing edge of a pulse (refer to FIG. 6(F)) corresponding to a pulse indicating a start bit is present immediately after the start of the period T, the "H" (high) level state is always set at the Q output of the first latch circuit 5901 on the trailing edge of the start bit as long as the address clock signal line 20 and data transmission signal line 70 are normal, even if data bits are all zeros.

On the other hand, in a case when the state of the data transmission line 70 is fixed at a "L" or "H" level over the constant time interval due to the transmission abnormality in the data transmission line 70, the Q output of the first latch circuit 5901 remains at an "L" level and is not set to the "H" level even if the reception interval specification pulse arrives thereat, since the trailing edge of the start bit is not sent to the clock input terminal CK.

Next, the Q output of a second latch circuit 5902 comprising a D-type flip-flop circuit is set at an "H" (high) level state at the time of a power on, i.e., in a state of the presence of the reception interval specification pulse by means of a signal (refer to FIG. 6(I)) received from the clear circuit 5800.

In addition, the Q output (refer to FIG. 6(G)) of the first latch circuit 5901 is connected to the data input D of the second latch circuit 5902. The clock input terminal CK thereof is connected to the output terminal of the AND gate 5903.

One input terminal of the AND gate 5903 is connected to an address coincidence signal transmission line 5300 an and other input terminal thereof is connected to the output terminal (refer to FIG. 6(B′)) of a monostable multivibrator 5904 which outputs a "H" level signal having a pulsewidth $t_3$ in response to a rising edge of its input signal.

The input terminal of the mono-stable multivibrator 5904 is connected to the address clock line 20 (refer to FIG. 6(A)) via an inverter 5905. The periodic pulsewidth modulated code string signal (for example, M-series code string signal) is present on the address clock signal transmission line 20 as described above.

It should be noted that a pulse having a pulsewidth of $t_1$ indicating the "L" level state on the address clock signal transmission line 20 and a pulse having a pulsewidth $t_1$ indicating the level of "H" are received on the address clock signal transmission line 20 and a timing of the trailing edge of the pulsewidth $t_0$ of the shorter pulse is slightly delayed with respect to the timing of the trailing edge of the start bit shown in FIG. 6(F) ($t_0 > t_2$).

The mono-stable multivibrator 5904 outputs the "H" (high level) pulse having the pulsewidh of $t_3$ in response to the trailing edge of each pulse-width modulated pulse constituting the periodic code string described above. Hence, the clock input terminal CK of the second latch circuit 5902 receives the "H" (high) level pulse at a timing slightly later than the trailing edge of the reception interval specification pulse during the presence of the reception interval specification pulse as shown in FIGS. 6(B′) and 6(E). The state of Q output of the first latch circuit 5901, i.e., the information on the presence or absence of the reception interval specification pulse latched by the first latch circuit 5901 is latched by the second latch circuit 5902 on the leading edge of the above-described "H" level pulse.

Since the Q output of the first latch circuit 5901 is set to "H" if the address clock signal transmission line 20 and data signal transmission line 70 are normal as described above, the Q output of the second latch circuit 5902 is also at the "H" level. For example, when the transmission abnormality occurs on the data signal transmission line 70, the Q output of the first latch circuit 5901 remains at the "L" level. Hence, the Q output of the second latch circuit 5902 is inverted from the "H" level to the "L" level.

In other words, if each signal transmission line 20, 70 is normal, the Q output of the second latch circuit 5902 remains at the "H" level. If the transmission abnormality occurs on either of the signal transmission lines 20, 70, the Q output of the second latch circuit 5902 immediately rises from the "L" level to the "H" level so that the transmission abnormality can be conveyed to the alarm unit 90 on the basis of the level change from the "L" level to the "H" level.

The construction of the abnormal transmission detection circuit in a case of detection of abnormal transmission on the address clock signal transmission line 20 is now described.

As described above, the output terminal of the monostable multivibrator 5904 outputs the "H" level pulse having a pulsewidth of $t_3$ within a constant pulse interval only if the address clock transmission line 20 is normal.

A capacitor 5906 charges gradually via a resistor 5907 and discharges immediately via a transistor 5908 which performs switching in response to the output signal of the mono-stable multivibrator 5904 (refer to FIG. 6(B)).

Hence, as long as the address clock signal transmission line 20 is normal as shown in FIG. 5(C), the charged voltage of the capacitor 5 does not exceed a threshold value Vth of an inverter 5909. However, if the transmission abnormality described above occurs and the pulse of the time series code string is not sent for a constant period of time, the charged voltage of capacitor 5906 increases and at last exceeds the threshold value Vth so that the output signal of the inverter 5909 is inverted from the "H" level to the "L" level (refer to FIG. 5(D)).

If therefore, the output signal of the inverter 5909 is monitored (refer to FIG. 5(D)), the abnormal transmission on the address clock transmission line 20 can be detected.

Since in this embodiment the Q output signal of the second latch circuit 5902 indicating the state of the data transmission line 70 and output signal of the inverter 5909 indicating the state of the address clock transmission line 20 are sent to the abnormal alarm unit 90 via a NAND gate circuit 5910, the alarm unit 90 can receive the information of the transmission abnormality in either of the address clock line 20 and data signal transmission line 70. A form of alarming by the alarm unit 90 may be changed depending on which of the both signal transmission lines 20 and 70 is abnormal.

In this way, since in this embodiment in order to detect the transmission abnormality of the data signal transmission line 70, the trailing edge of the start bit on the data signal transmission line is present, the abnormal transmission detection circuit stores the state of presence or absence of the reception interval specification pulse in response to the trailing edge of the start bit, and confirms the storage contents within the same reception interval a slightly later than a timing of the storage operation, only two latch circuits and a minute delay circuit element are equipped as circuit elements of abnormal transmission detection circuit. Specifically, with the fact that the trailing edge of the pulse-width modulated pulse constituting the periodic code string as in this embodiment is always sent on the signal line 20 at a time later than the trailing edge of the start bit in mind, the data transfer from the first latch circuit to the second latch circuit is carried out at the timing so that the delay circuit element is not needed and thus circuit integration can extremely easily be achieved.

In addition, since the presence or absence of the reception interval specification pulse is detected on the trailing edge of the start bit as different from the conventional abnormal transmission detection system which measures the pulse interval inputted on the same signal transmission line, such a kind of abnormal transmission as described above can quickly be detected without influence on the detection required time even if the number of data slots is increased.

It should be noted that although the trailing edge of the pulse-width modulated pulse constituting the periodic code string is used as means for reading the output contents of the first latch circuit into the second latch circuit at a time slightly later than the timing of the trailing edge of the start bit, a delay circuit constituted by a capacitor having a small capacity may alternatively be installed so as to form a pulse at a time slightly later than a time at which the trailing edge of the start bit appears. At this time, the data transfer control to the second latch circuit from the first latch circuit may be carried out. The abnormal transmission detection circuit for the time-shared multiplex transmission network system according to the present invention can quickly detect the above-described kind of abnormal signal transmission and can facilitate the circuit integration.

It will clearly be understood by those skilled in the art that the foregoing description is made in terms of the preferred embodiment and various changes and modifications may be made without departing from the scope of the present invention which is to be defined by the appended claims.

What is claimed is:

1. A circuit comprising:
   (a) first address clock generating means for generating a periodic pulse train signal and transmitting the periodic pulse train signal;
   (b) second means for providing a passage for transmitting data from a first station to a second station when the periodic pulse train signal from said first means is received and one of the series of addresses derived from the periodic pulse train signal accords with a predetermined address;
   (c) third means for generating and outputting a first signal when no pulse from said first means is present for a predetermined interval of time;
   (d) fourth means for generating and outputting a second signal when no data from said second means is present, the address being according with the predetermined address; and
   (e) fifth means for producing an alarm in response to at least one of said first and second signals.

2. The circuit according to claim 1, wherein said data comprises a plurality of bits and including a start bit and wherein said fourth means comprises: sixth means for detecting whether the address coincides with said predetermined address and outputting a third signal indicating that the address coincides with said predetermined address; and seventh means for detecting whether the third signal is present immediately before a reference edge of the start bit and outputting the second signal when the third signal is not present.

3. A circuit as recited in claim 1 wherein said first address clock generating means comprises an address clock line connecting a plurality of stations and
   said second means comprises a data transmission line connected to said plurality of stations for transmission of data thereamong.

4. A circuit for detecting an abnormal transmission on a signal transmission line, comprising:
   (a) a plurality of data transmitters and receivers;
   (b) first address clock generating means for generating a series of addresses and transmitting the generated series of addresses in a periodic signal form to each of said data transmitters and receivers via an address clock transmission line, the transmission of addresses being controlled with the periodic signal;
   (c) second means for receiving the periodic signal from said first means via the address clock transmission line, determining whether one of the series of addresses accords with a predetermined address allocated thereto and outputting a first signal, including a first pulse indicating that the address accords with said predetermined address, during a duration of said first pulse a pair of devices, including one data transmitter and one receiver having the same predetermined address carrying out sending and receiving of a predetermined number of data bits including a start bit via a data transmission line;
   (d) third means for detecting whether the periodic signal G is received on the address clock transmission line and outputting a second signal when the periodic signal is not received for a predetermined interval of time; and
   (e) fourth means for detecting whether the level of the data transmission line changes during the receipt of the first signal from said second means on the basis of a reference edge of the start bit constituting the data on the data transmission line, and outputting a third signal indicating that the level of the data transmission line does not change during the receipt of the first signal; and
   (f) fifth means for producing an alarm in response to at least one of said second and third signals.

5. The circuit according to claim 4, wherein said fourth means comprises: (a) first latch circuit which is set in a state indicating no presence of the first pulse on a trailing edge of the first pulse and latches the state of presence or absence of the first pulse on a trailing edge of the start bit on the data transmission line; and (b) a second latch circuit which is initially set in a state indicating the presence of the first pulse and latches the state of presence or absence of the first pulse latched in said first latch circuit at a time when the duration of the first pulse continues and with a predetermined delay with respect to the appearance of the trailing edge of the start bit on the data transmission line, the latched state of said second latch circuit being outputted to said fifth means as the presence or absence of the third signal.

6. The circuit according to claim 5, wherein said third means comprises: a first inverter which inverts a signal level of the periodic signal from said first means; a monostable multivibrator which receives the inverted signal of said inverter and outputs a fourth signal in response to each trailing edge of the inverted periodic signal; a transistor which turns on whenever the fourth signal has arrived thereat; a time-constant circuit which charges when said transistor is nonconductive for outputting the second signal to said fifth means when the charged voltage exceeds a threshold value.

7. The circuit according to claim 6, wherein said first latch circuit comprises a first, D-type flip-flop circuit having a data input terminal connected to a reset terminal thereof for receiving the first pulse from said second means and a clock terminal for receiving the data from the data transmission line and said second latch circuit comprises a second D-type flip-flop circuit having a data input terminal connected to a Q output terminal of said first flip-flop circuit, a set terminal receiving a voltage having a predetermined level and a clock terminal for receiving a logical product between the first signal and the fourth signal from said monostable multivibrator.

8. The circuit according to claim 7, which further comprises sixth means for clearing the contents of said second means when a power supply is turned on and supplying the voltage to the set terminal of said second D-type flip-flop circuit.

9. The circuit according to claim 4, wherein said second, third and fourth means are incorporated in at least one of said data receivers.

10. The circuit according to claim 4, wherein said first means generates the periodic signal in accordance with a predetermined time-series sequence.

11. The circuit according to claim 4, wherein said fifth means produces the alarm in a form depending on which of said second and third signals is received.

12. The circuit according to claim 5, wherein said fourth means comprises a delay circuit which produces a second pulse with said predetermined delay with respect to the appearance of the trailing edge of the start bit in response to the each pulse in the periodic signal from said first means, the level transfer from said first latch circuit to said second latch circuit being controlled by means of said second pulse.

13. A system comprising:
(a) first address clock generating means for generating a periodic pulse train signal and transmitting the periodic pulse train signal;
(b) second means for providing a passage for transmitting data from a first station to a second station when the periodic pulse train signal from said first address clock generating means is received and one of the series of addresses derived from the periodic pulse train signal accords with a predetermined address;
(c) third means for generating and outputting a first signal when no pulse from said first means is present for a predetermined interval of time;
(d) fourth means for generating and outputting a second signal when no data from said second means is present, the address being according with the predetermined address; and
(e) fifth means responsive to either of said first or second signal for determining a failure of the system.

14. A circuit as recited in claim 13 wherein said first address clock generating means comprises an address clock line connecting a plurality of stations and
said second means comprises a data transmission line connected to said plurality of stations for transmission of data thereamong.

* * * * *